US009083806B2

(12) United States Patent
McCormack et al.

(10) Patent No.: US 9,083,806 B2
(45) Date of Patent: Jul. 14, 2015

(54) METHOD OF BOOTSTRAPPING CONTACT CENTER

(71) Applicant: Avaya Inc., Basking Ridge, NJ (US)

(72) Inventors: Tony McCormack, Galway (IE); Paul D'Arcy, Limerick (IE); Neil O'Connor, Galway (IE); Sean Burke, Galway (IE); Joseph Smyth, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,013

(22) Filed: Sep. 28, 2012

(65) Prior Publication Data

US 2014/0093062 A1    Apr. 3, 2014

(51) Int. Cl.
  *H04M 3/00* (2006.01)
  *H04M 5/00* (2006.01)
  *H04M 3/523* (2006.01)

(52) U.S. Cl.
  CPC ...... *H04M 3/5233* (2013.01); *H04M 2203/558* (2013.01)

(58) Field of Classification Search
  USPC ................................ 379/265.12, 265.01, 309
  See application file for complete search history.

(56) References Cited

U.S. PATENT DOCUMENTS

| 6,170,011 | B1* | 1/2001 | Macleod Beck et al. ...... 709/224 |
| 6,704,410 | B1 | 3/2004 | McFarlane et al. |
| 7,072,966 | B1* | 7/2006 | Benjamin et al. ............. 709/228 |
| 7,536,003 | B2* | 5/2009 | Onodera et al. .............. 379/267 |
| 7,596,502 | B2* | 9/2009 | Dolle et al. .................... 705/313 |
| 2003/0172133 | A1* | 9/2003 | Smith et al. ................... 709/219 |
| 2006/0123060 | A1* | 6/2006 | Allen et al. ................... 707/200 |
| 2007/0168337 | A1* | 7/2007 | Onodera et al. ................ 707/3 |
| 2010/0121672 | A1* | 5/2010 | Kohler et al. .................... 705/9 |

* cited by examiner

*Primary Examiner* — Quynh Nguyen
(74) *Attorney, Agent, or Firm* — Maldjian Law Group LLC; John Maldjian; Alexander D. Walter (57) ABSTRACT

Embodiments of the present invention provide a system and method to generate skill information. The method includes retrieving information relating to an agent of a contact center, wherein the information includes document and information repositories, knowledge sharing reports, mail repositories, and customer, supervisor, and peer feedbacks. The information may also include information from external sources including social network. The method further includes determining keywords from the retrieved information, and generating skill information for the at least one agent.

19 Claims, 5 Drawing Sheets

| Agent ID 402 | Internal Database 404 | External Sources 406 |
|---|---|---|
| 001 | Wireless routing, VPN, Spanish Spanish, VPN, CISCO, Router, English CISCO, Wireless Router, Best Practices | Network engineer, wireless solutions, certified wireless engineer |
| 002 | Cosmetics, Clothing French, belt, perfumes, English Luxury, brands, | Gucci, perfumes, clothing line, brands |
| 003 | Mutual fund, bonds Stock, Italian, Spanish, bonds Corporate finance, investing | Certified Financial analyst, Finance Diploma |

| Agent ID 502 | Skill 504 | Proficiency 506 |
|---|---|---|
| 003 | Investing, Financial queries | High |
| 003 | Spanish | Read, Write, Speak |
| 003 | Italian | Read, Write |
| 003 | English | Read |

METHOD OF BOOTSTRAPPING CONTACT CENTER

BACKGROUND

1. Field of the Invention

Embodiments of the present invention generally relate to contact center monitoring, and more particularly to generating skill information of an agent.

2. Description of Related Art

Contact centers are employed by many enterprises to service inbound and outbound contacts from customers. A typical contact center routes incoming requests/contacts to one or more resources, such as human agents and automated resources (e.g., Interactive Voice Response (IVR) units), to service the incoming requests/contacts. Contact centers distribute contacts, whether inbound or outbound, for servicing to any suitable resource according to predefined criteria.

Normally in present-day operations, when an Automatic Call Distributor system's controller detects an agent has become available to handle a contact, the controller identifies all predefined contact-handling queues for the agent (usually in some order of priority) and delivers to the agent the highest-priority, oldest contact that matches the agent's highest-priority queue. This delivery may be based on one or more of the contact center's objectives.

Usually, the primary objective of contact center management is to maximize contact center's performance and profitability. An ongoing challenge in contact center administration is monitoring and optimizing contact center efficiency. Contact center efficiency is generally measured in two ways.

Service level is one measurement of a contact center's efficiency. Service level is typically determined by dividing the number of contacts accepted within the specified period by the number accepted plus the number that were not accepted, but completed in some other way (e.g., abandoned, given busy, cancelled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period.

An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Therefore, it is an objective of most contact centers to optimize match rate along with service level.

Thus, within a contact center, to improve the overall efficiency and profitability, it is in the best interest that a primary skill level agent accepts each and every contact. It is a supervisor's role to identify these skills and subsequently assign agents to contact, where the agents will be considered primary skill level agent.

Conventional solutions for identifying primary skill agent require substantial manual input from each supervisor for his team. However, a typically contact center has thousands of agents, each with multiple skills that might add to the efficient and efficacy of the contact center. Moreover, over a period of time, agents may develop other skills and become primary skill level agent, at those skills, as well.

Thus, there is need for an automated system and method for generating skill information of agents in a contact center.

SUMMARY

These and other needs are addressed by the various embodiments and configurations of the present invention. Embodiments of the present invention are directed generally to a method, an apparatus, and a computer readable medium for generating skill information of persons in a contact center.

In one embodiment, the present invention may provide a method for generating skill information. The method includes retrieving information relating to an agent of a contact center, wherein the information includes internal information such as, knowledge sharing reports, mail repositories, and customer, peer, and supervisor feedbacks. The information may also include external source of information such as feeds from Twitter, Facebook, and LinkedIn accounts of the respective agent. Further, the method includes determining keywords from the retrieved information, and generating skill information for the at least one agent, based on a match between the determined keywords and a predefined list of keywords.

Embodiments of the present invention may further provide a computer-readable medium having stored thereon instructions that, if executed by a processor, cause the processor to execute a method for generating skill information. Operationally, the method includes retrieving information relating to an agent of a contact center, wherein the information includes internal information such as, knowledge sharing reports, mail repositories, and customer, peer, and supervisor feedbacks. The information may also include external source of information such as feeds from Twitter, Facebook, and LinkedIn accounts of the respective agent. Further, the method includes determining keywords from the retrieved information, and generating skill information for the at least one agent, based on a match between the determined keywords and a predetermined list of keywords.

Embodiments of the present invention may further provide an apparatus comprising a processor, wherein the processor is configured for generating skill information. Operationally, the processor is configured for retrieving information relating to an agent of a contact center, wherein the information includes internal information such as, knowledge sharing reports, mail repositories, and customer, peer, and supervisor feedbacks. The information may also include external source of information such as feeds from Twitter, Facebook, and LinkedIn accounts of the respective agent. Further, the processor is also configured for determining keywords from the retrieved information, and generating skill information for the at least one agent, based on a match between the determined keywords and a predetermined list of keywords.

BRIEF DESCRIPTION OF THE DRAWINGS

The above and still further features and advantages of the present invention will become apparent upon consideration of the following detailed description of embodiments thereof, especially when taken in conjunction with the accompanying drawings, wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

The preceding is a simplified summary of embodiments of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

DETAILED DESCRIPTION

Embodiments of the present invention will be illustrated below in conjunction with an exemplary system. Although well suited for use with, e.g., a contact center system, the present invention is not limited to any particular type of system or configuration of system elements. Those skilled in the art will recognize that the disclosed techniques may be used in any system in which it is desirable to provide improved skill provisioning mechanism.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments of the present invention are considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

"Key Performance indicator" refers to a contact center performance measure that is used by a service level agreement to set performance expectations, requirements, or specifications.

The term "skill" as used herein may refer to substantially any property or attribute that the contact uses to characterize knowledge or capabilities of an agent.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated that individual aspect of the present invention can be separately claimed.

Figure 1:
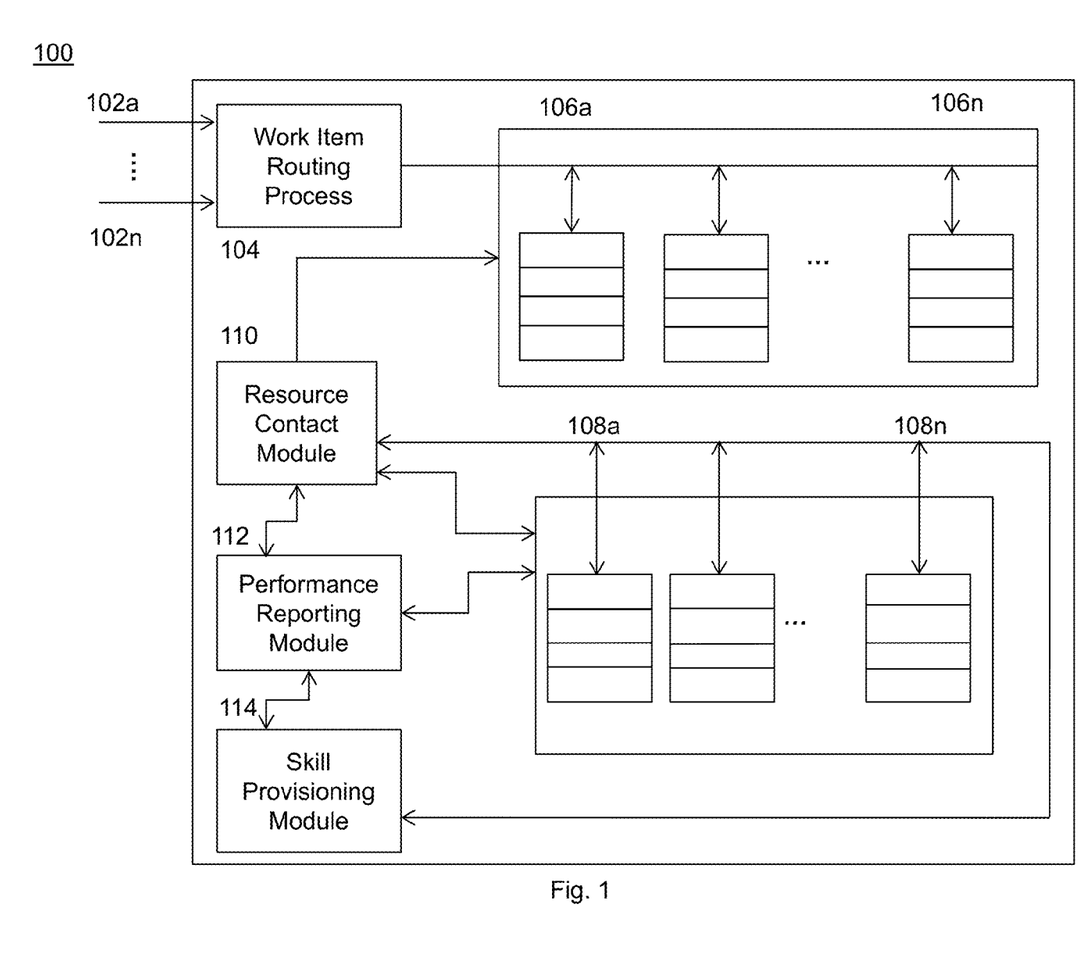
FIG. 1 is a block diagram of a system according to an embodiment of the present invention.

FIG. 1 illustrates a block diagram of a system 100 according to an embodiment of the present invention. The system 100, operable in a contact center, receives a plurality of contacts 102a-n (each contact could request for one or more of a voice call support, a chat support, an email support, etc.). The plurality of contacts 102a-n are assigned by working item routing modules 104 to different contact queues 106a-n. Embodiments in accordance with the present invention are also usable in contact centers in which queues may not be maintained—i.e. routing of work items to agents does not necessitate or prescribe that this is implemented as queues. This assignment may be based on a number of predetermined criteria such as, but not limited to, customer identity, customer needs, contact center needs, current contact center queue lengths, customer value, and the agent skill. Conventionally, contacts are prioritized, and are either queued in individual contact queues 106a-n in their order of priority or are queued in different ones of a plurality of contact queues that correspond to a different priority. Each of the contact queues 106a-n corresponds to a different set of agent queues 108a-n, wherein each agent's queues are prioritized according to his or her level of expertise or skill in that queue, and either agents are queued in individual agent queues 108a-n in their order of expertise level or are queued in different ones of a plurality of agent queues 108a-n that correspond to a queue and each one of which corresponds to a different expertise level. Furthermore, an agent may have different levels of skill expertise (e.g., skill levels 1-N in one configuration or merely primary skill levels and secondary skill levels in another configuration), and hence may be assigned to different agent queues 108a-n.

In one configuration, the contact center is operated by a contract operator, and each of the contact queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Further, the system includes a resource contact selection module 110 and performance reporting module 112. The resource contact selection module 110 monitors the occupants of the work item and agent queues 106a-n and 108a-n, respectively, and contact center objectives, rules, and policies and, assigns agents to service work items. As will be appreciated, the system 100 is notified of an incoming contact. The incoming contact is held, until the resource contact selection module 110 forwards instructions to the work item routing process 104 to forward or route the contact to one of the plurality of contact queues 106a-n. The resource contact selection module distributes and connects these contacts to one of the available agents based on the predetermined criteria noted above.

While the agents are connected to contacts, the performance reporting module 112 receives contact center operational information, such as but not limited to, service level, expected wait time, predicted wait time, actual wait time, number of contacts waiting, percent abandons, average active during a call, average speed of answer, average hold time, percent of work items that are one and done, match rate, Percent Agent Disconnects First, Percent available, Percent Conferences, Percent Discussion from On Hold, Percent in Service Level, Percent Occupancy, Percent Redirects, Percent Transfers, Percent Transfers to Same Routing Point, Abandon Duration, Abandons, Abandons, Percent, Acceptables, Accepts, Active Duration, Active Duration, Average, Active Staffed Agents by Routing Point, Active Staffed Agents by Queue, Actives, Adherence to schedule, Adherence to procedures, Adjunct Attempts, Adjunct Redirects, Agent Occupancy, Agent State Duration, Agents Staffed, Agents in Aux. State, Agent Turnover rate, Alert Duration, Alert Duration, Average, Alerting Agents Staffed, Arrivals, Audio Difficulties, Auto Reserve Duration, Average Speed of Answer (ASA), Average Handle Time (AHT), Behind Target Duration, Behind Target Not Reserving Duration, Busies, Busies, Percent, Call Blockage, Cancels, Cancels, Percent, Conferences, Contacts at Agent, Contacts Finished Waiting, Contacts Waiting, Cost per contact (per media), Customer defection rate, Customer Satisfaction, Critical Duration, Curr. Max. Wait Duration, Dequeues, Direct Agent Contacts Waiting, Discussion from On Hold, Error or rework percentage or volume, Exp. Wait, First Call Resolution (First resolution rate), Handle Duration, Handle Duration, Average, Handles, Held Contacts, Idle Agents Staffed, Idle Duration, In Focus Hold Agents Staffed, In Focus Hold Duration, Inflows, Initiating Agents Staffed, Interflows, Initiate Duration, Interactions, Interactions at Agent, Max Delay in Queue (longest delay in queue), Net. Discussion, Net. in Duration, Net. Polls, Net. Redirects, Non-Working Aux. Agents Staffed, Non-Working Aux. Duration, Number of times a customer contacted the company, Occupied Duration, On Hold Agents Staffed, On Hold Contacts, On Hold Duration, On Target Duration, Out of Focus Hold Duration, Outflows, Outflows, Percent, Preview Agents Staffed, Preview Duration, Previews, Quality Monitoring Scores, Queue Duration, Redirects, Reserve Handles, Reserve Standby Agents Count, Returns, Service Level, Self Service Availability, Short Contacts, Short Seizures, Silence Duration, Staff Shrinkage (Shrinkage), State Duration, Staffed Duration, Successful Sales (number) or percentage, Successful upsell (number or percentage), Transfer Rate, Unknown Agents Staffed, Unknown Duration, Unoccupied Duration, Unstaffed Queue, Wait Duration, Working Aux. Agents Staffed, Working Aux. Duration, Wrap-up Agents Staffed, Wrap-up Duration, Wrap-up Duration, Average, and Wrap-ups, any other performance indicators known or later developed, and any combinations thereof.

The performance reporting module 112 analyses the information, and predicts if and when a performance measure for a work item queue will cross a threshold, determines the penalty (e.g., financial impact) for crossing the threshold and/or provides a set of recommendations or corrective actions to avoid violating the threshold and/or reduce the penalty associated with threshold violation. Once an administrator determines a performance measure for a work item queue will cross a threshold, the administrator would immediately want to assign highly proficient agents to these work items queues 106a-n. The term "proficient agent" used herein refers to an agent that typically can handle contacts effectively and/or efficiently. In other words, the proficient agent is one that typically can handle contacts of a certain nature most effectively and/or efficiently. Thus, the contacts received by the proficient agent are typically handled more quickly and accurately or effectively (e.g., higher revenue attained) than a contact received by a secondary or even backup skill level agent. A person with ordinary skill in the art would appreciate that hereafter the terms "proficiency" and "primary skill level" and variations therefore are used interchangeably.

Thus for reassigning a proficient agent to these work items 106a-n, the administrator would use the skill provisioning module 114, as described by the teaching of the disclosure herein.

Figure 2:
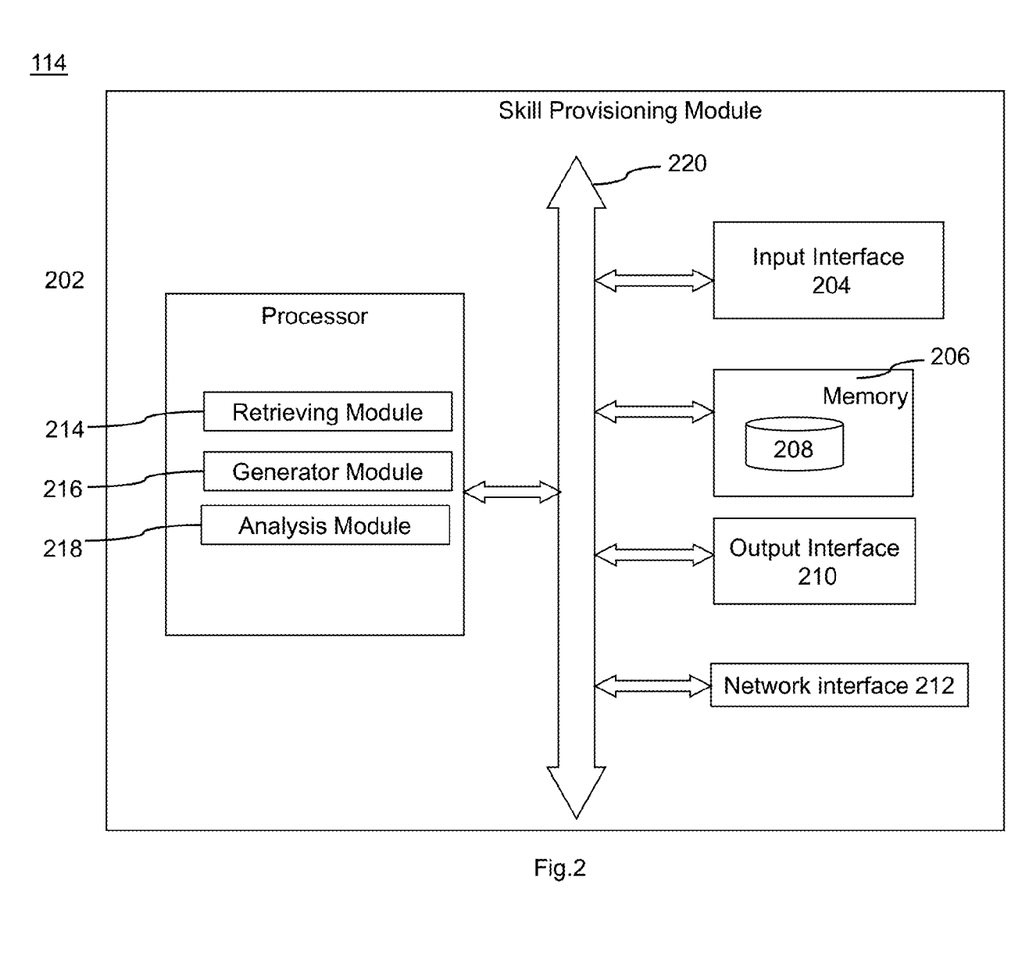
FIG. 2 illustrates a block diagram showing exemplary components of a module for implementing the present invention, in accordance with an embodiment of the present invention

FIG. 2 illustrates various exemplary components of skill provisioning module 114. As shown, the skill provisioning module 114 includes a processor 202, an input interface 204, a memory 206, an output interface 210, and a network interface 212. A bus 220 communicable connects/couples the processor 202 to each of the input interface 204, the output interface 210, the network interface 212, and the memory 206.

The memory 206 may be connected to a database 208. The database 208 may include information about various agents including, but not limited to, customer feedbacks, supervisor feedback, peer feedback, mailbox repositories, contribution to various internal bulletin boards, contribution to various events/activities, knowledge sharing documents, and files from share point and similar services. Moreover, database 214 may also include external sources of information relating to the agent of the contact center. Examples of external information such as, but not limited to, twitter posts, feeds from Facebook accounts, data from LinkedIn accounts, data from contribution to various external bulletin boards, etc.

In an embodiment of the present invention, database 208 may be stored in memory 206. In another embodiment of the present invention, database 208 may be stored at an external device. The memory 204 may be one of a Random Access Memory (RAM), a cache, a Dynamic RAM (DRAM), a Static RAM (SRAM), hard disk drives, portable drives, etc.

Typically, although not necessarily, operation of memory 206 in storing and retrieving data is governed by commands from processor 202. The memory 206 further comprises instructions, which when executed by processor 202, generates skill information of the agents, as disclosed by the teachings of the disclosure herein.

FIG. 2 also illustrates exemplary components of the processor 202, in accordance with an embodiment of the present invention. The processor 202 includes a retrieving module 214 that retrieves information relating to the agents from external and internal sources. While retrieving the information the retrieving module may communicate with external sources using the network interface 212. Once the information is retrieved, the retrieving module stores a copy of the information in the memory 206 and/or the database 208.

The processor further includes a generator module 216 for parsing the retrieved information and generating concepts relating to the retrieved information. In particular, the generator module 216 uses Natural language Processing (NLP), semantic, or ontology generation algorithms for generating concept relating to the retrieved information. While the generator module 216 generates concepts, it also associates the concepts to the agents, as illustrated by the internal database 400 of FIG. 4.

After the concepts are generated, an analysis module 218 analyses each concept and compares it to a predetermined list of keywords associated with one or more agent's skills. When the analysis module 218 determines a match between one or more generated concepts and a predetermined list of keywords, it associated with a skill. The analysis module 218 indexes the agent's identifier along with the particular skill. In one instance, the predetermined list of keywords associated with financial support skill may be mutual funds, treasury bonds, English, Italian, Spanish, stocks, SEC, etc. Thus, when the analysis module determines a match between one or more of these keywords and the generated concepts, the analysis module creates an association table and associates the agent with the skill, as illustrated by the association table of FIG. 5.

Once the analysis module 218 has determined one or more skills associated with agents, the analysis module 218 determines the proficiency level of the agents in each of the one or more skills. The analysis module 218 determines the proficiency levels, by analysing the concepts generated from internal sources such as, but not limited to, supervisor feedback, customer feedback, annual performance reviews, knowledge certifications, peer feedback, etc. In one embodiment of the present invention, the proficiency level of the agent may be defined on the basis of the ability of the agent to read, write, and speak a particular language.

Figure 5:
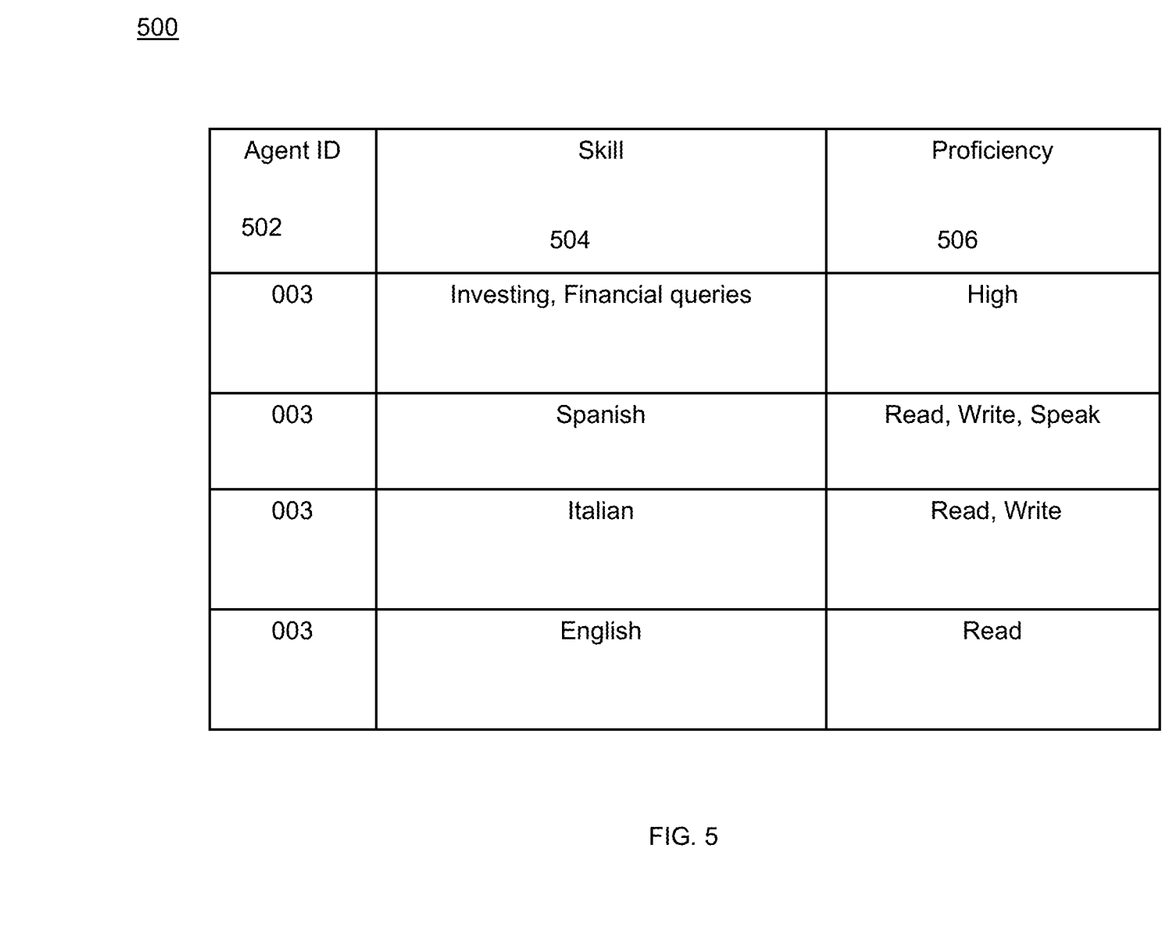
FIG. 5 is an association database generated in accordance with an embodiment of the present invention.

Once the proficiency level of an agent is determined, the analysis module 218 updates an association database 500. The association database associates the agents, their skills, and the proficiency level, as illustrated by FIG. 5. For the sake of simplicity, FIG. 5 illustrates records for one agent only. Those skilled in the art will recognize that an association database 500 may comprise information relating to all agents of a system.

Even though the modules have been shown comprised within a processor 202, ones having ordinary skill in the art would appreciate these modules can exist as independent hardware, software, or firmware or a combination thereof and may further be performed at a single hardware device or a combination of hardware devices at multiple devices.

Figure 3:
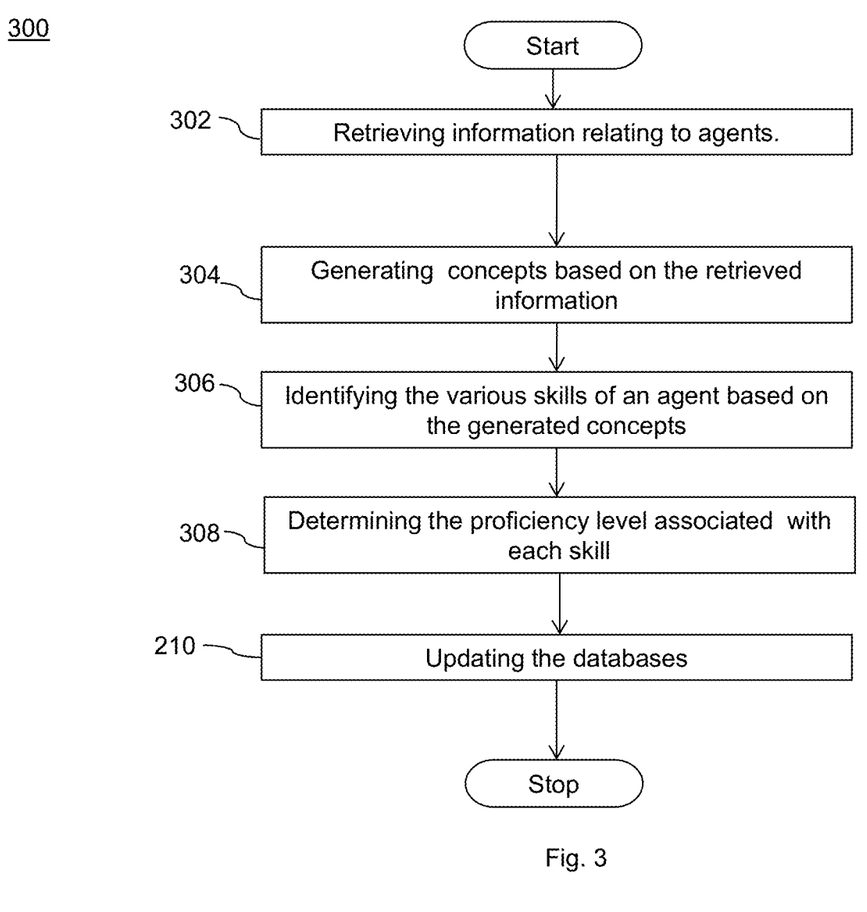
FIG. 3 is a flowchart illustrating a method for generating skill information in accordance with an embodiment of the present invention.

FIG. 3 illustrates a method (300) in accordance with the teachings herein for generating skill information. FIG. 3 illustrates a method 300 performed at a skill provisioning module 114. In one embodiment, the method 300 may initiate based on data from performance reporting module 112. In another embodiment, an administrator of system/contact center 100 may initiate method 300. While in another embodiment, the method 300 may be initiated periodically or on occurrence of some event/alert.

As discussed above, the processor 202 generates the skill information for agents of a contact center/system. At step 302, the retrieving module 214 retrieves information related to the agents from external and internal sources. Example of internal information including, but not limited to, customer feedbacks, supervisor feedback, peer feedback, mailbox repositories, contribution to various internal bulletin boards, contribution to various events/activities, shared documents, and files from share point and similar services. Further, example of external sources of information such as, but not limited to, twitter posts, feeds from facebook accounts, data from linkedin accounts, data from contribution to various external bulletin boards, etc.

Once the information is retrieved, method 300 progresses to step 304. At step 304, the generator module 216 parses the retrieved information and generates concepts relating to the retrieved information. In particular, the generator module 216 uses Natural language Processing (NLP), semantic, or ontology generation algorithms for generating concept relating to the retrieved information. While the generator module 216 generates concepts, the generator module 216 also associates these concepts to the agents in an internal database 400, as illustrated by FIG. 4.

Figure 4:
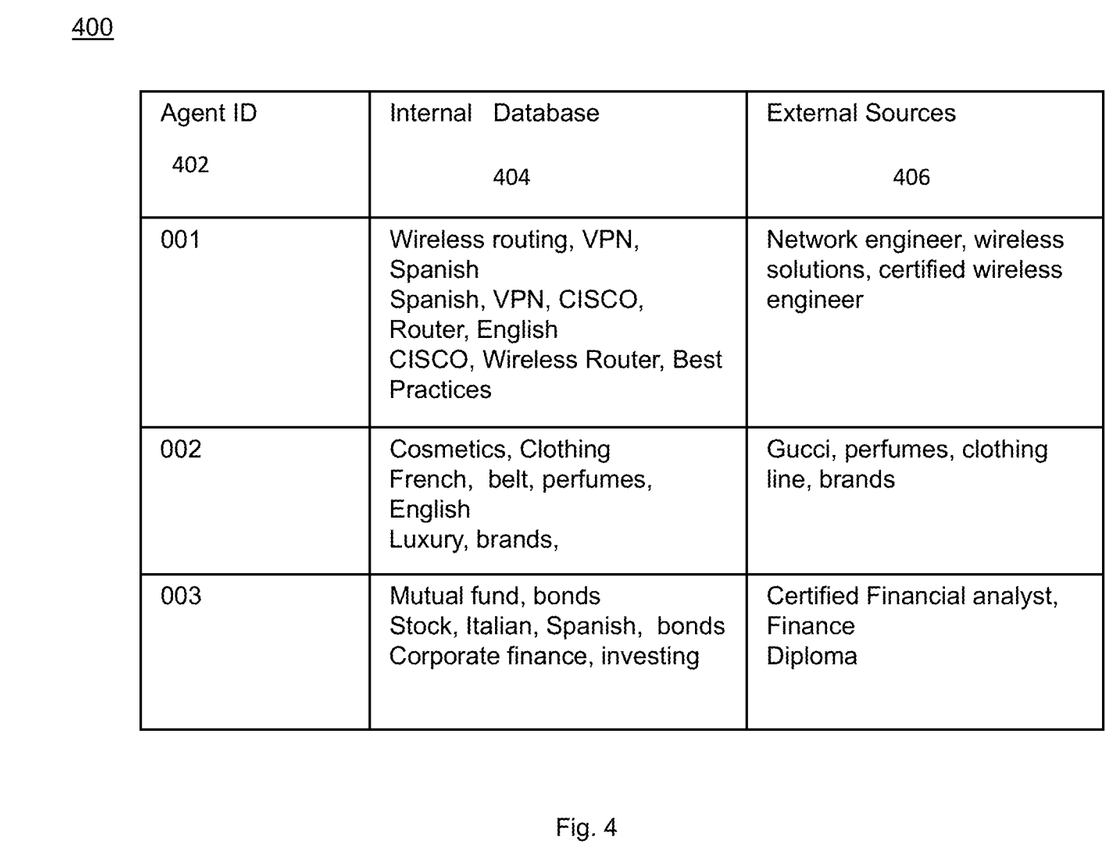
FIG. 4 is an internal database generated in accordance with some embodiments of the present invention.

In particular FIG. 4 illustrates the internal database 400 in accordance with some embodiments. The internal database maintains an association between the agents and the concepts generated from the various sources. The database includes an agent identifier field 402, an internal database field 404, and an external sources field 406. The agent identifier field 402 uniquely identifies one or more agents (e.g., 001) associated with the system/contact center. The internal database field 406 comprises the concepts that are generated from internal sources, such as, but not limited to, customer feedbacks, supervisor feedback, peer feedback, mailbox repositories, contribution to various internal bulletin boards, contribution to various events/activities, shared documents, and files from share point and similar services. The external source field 406 comprises all the concepts generated from external sources such as, but not limited to, twitter posts, feeds from Facebook accounts, data from LinkedIn accounts, data from contribution to various external bulletin boards, etc.

Turning again to the method 300 performed at a skill provisioning module 114, once the concepts are generated, the method 300 progresses to step 306. At step 306, the analysis module 218 compares the generated concepts to a predetermined/predefined list of keywords associated with one or more agent's skills. The predetermined list of keywords is generated for each skill, which is required in the system. These keywords can be generated manually, automatically using NLP, Semantic and other algorithms, or by a hybrid method using both manual and automatic processes.

In one instance, the predetermined list of keywords associated with financial process support skill may be Mutual funds, Treasury bonds, English, Italian, Spanish, Stocks, SEC, etc.

When the analysis module identifies a match between one or more of the predetermined keywords and the generated concepts, the analysis module creates an association table entry and associates the agent with the skill, as illustrated by the association database of FIG. 5.

In particular FIG. 5 illustrates the association database 500 in accordance with some embodiments. The association database 500 maintains an association between the agents, their skills, and a proficiency level associated with the skills. The database includes an agent identifier field 502, a skill field 504, and a proficiency field 506. The agent identifier field 502 uniquely identifies one or more agents (e.g., 003) associated with the system/contact center. The skill field 504 comprises the various skills (investing, Spanish, Italian, English, etc.) of the agent, and the proficiency field 506 indicated the level of proficiency (E.g. High, Medium, Low, Read, Write, Speak etc.) of an agent with the respected skill. The proficiency level associated with each skill is generated by the analysis module, as explained in the following description.

Turning again to the method 300 performed at a skill provisioning module 114, after the analysis module 218 has identified one or more skills associated with agents, the method 300 progresses to step 308. At step 308, the analysis module 218 determines a proficiency level of the agents with their respective skills. For determining the proficiency level of the agent, the analysis module 218 analyses the concepts generated from internal information sources such as, but not limited to, Supervisor feedback, customer feedback, annual performance reviews, knowledge certifications acquired, peer feedback, etc. These internal information sources may also comprise information relating to the proficiency level based on the feedbacks (E.g. Customer Feedback, Peer Feedback, Supervisor Feedback) received by the agent, while managing similar transactions in the past. Once the proficiency level of an agent is determined, the method progresses to step 310. At step 310, the analysis module 218 updates the previous copies of association database 500 and the internal database 400 with the relevant information.

After the internal database 400 and the association database 500 are updated, the databases (400, 500) are available to the administrator of the system/contact center via output interface 210. Output devices 210 may include a software or a hardware interfaces for accessing the databases (400, 500). While accessing the databases (400, 500), the administrator may use input interfaces 204 to edit, filter, and process the data.

The administrator may use the input interface to process the data from the databases (400 and 500) to identify a list of agents that can be reassigned to this task, and can further set a reassignment priority based on the proficiency level of the agents i.e., the agents with higher proficiency are reassigned to a task before those with medium or lower proficiency. In one embodiment, the administrator might restrict the reassignment of agents to a particular proficiency level only.

In the foregoing specification, specific embodiments have been described. However, one of ordinary skill in the art appreciates that various modifications and changes can be made without departing from the scope of the present invention as set forth in the claims below. For example, the order of the signaling within each flow diagram does not necessarily denote order and timing of the signaling unless specifically indicated.

Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A computer-implemented method to generate skill information, the method comprising:
    retrieving information relating to at least one agent, the information retrieved from both an internal source of information and an external source of information;
    determining keywords from the retrieved information by applying natural language processing, semantic or ontology generating algorithms and associating the keywords with at least one agent in an internal database where the internal database maintains an association between the agents and the determined keywords; and
    generating skill information for the at least one agent by matching the determined keywords to a predefined list of keywords associated with one or more agent's skills, determining the proficiency level of the agents in one or more skills and updating an association database where the association database maintains an association between the agents, their skills and their proficiency level.

2. The method of claim 1, further comprising utilizing the skill information of the at least one agent to assign a task to the at least one agent.

3. The method of claim 1, further comprising the step of updating an internal database based upon the skill information of at least one agent gathered from a social media source.

4. The method of claim 3, wherein the step of updating comprises updating the agent's proficiency, associated with the skill, in the internal database.

5. The method of claim 1, wherein the retrieved information is retrieved from at least one internal source selected from the group consisting of a knowledge sharing reports, mailbox repositories, customer feedbacks, peer feedbacks, supervisor feedbacks, contribution to various internal bulletin boards, contribution to various events, files from share points and shared documents, associated with the at least one agent.

6. The method of claim 1, wherein the retrieved information may also be retrieved from at least one external source selected from a group comprising Twitter posts, Facebook account feeds, data from LinkedIn account, and data contributions from various external bulletin boards, associated with the at least one agent.

7. The method of claim 1, further comprises:
    determining the at least one agent's proficiency associated with the skill based upon previous transactions handled by the at least one agent.

8. The method of claim 7, wherein agent's proficiency is derived from at least one source selected from the group consisting of customer feedbacks, peer feedback, and supervisor feedback on the previously managed transaction.

9. A system to generate skill information, the system comprising:
    a retrieving module configured to retrieve information relating to at least one agent, the information retrieved from both an internal source of information and an external source of information;
    a generator module configured to determine keywords from the retrieved information by applying natural language processing, semantic or ontology generating algorithms and associating the keywords with at least one agent in an internal database where the internal database maintains an association between the agents and the determined keywords; and
    an analysis module configured to generate skill information for the at least one agent by matching the determined keywords to a predefined list of keywords associated with one or more agent's skills, determining the proficiency level of the agents in one or more skills and updating an association database where the association database maintains an association between the agents, their skills and their proficiency level.

10. The system of claim 9, wherein the analysis module is further configured to assign a task to the at least one agent based on the skill information.

11. The system of claim 9, wherein the proficiency level of the agents maybe defined on the basis of the ability of the agent to read, write and speak a particular language.

12. The system of claim 9, wherein the analysis module is further configured to update an internal database based upon the skill information of at least one agent gathered from a social media source.

13. The system of claim 9, wherein the predetermined list of keywords associated with financial support skill comprises one or more mutual funds, treasury bonds, stocks, SEC.

14. The system of claim 9, wherein the analysis module is further configured to determine the at least one agent's proficiency associated with the skill based upon previously managed transactions by the at least one agent.

15. The system of claim 14, wherein the analysis module is configured to determine the agent's proficiency from at least one source selected from the group consisting of customer feedbacks, internal feedback, and response review of the previous managed transaction stored in the memory.

16. A computer-readable medium having stored thereon instructions that, if executed by a processor, cause the processor to execute a method comprising:
   retrieving information relating to at least one agent, the information retrieved from both an internal source of information and an external source of information;
   determining keywords from the retrieved information by applying natural language processing, semantic or ontology generating algorithms and associating the keywords with at least one agent in an internal database where the internal database maintains an association between the agents and the determined keywords; and
   generating skill information for the at least one agent by matching the determined keywords to a predefined list of keywords associated with one or more agent's skills, determining the proficiency level of the agents in one or more skills and updating an association database where the association database maintains an association between the agents, their skills and their proficiency level.

17. The computer-readable medium of claim 16, further comprising instructions to utilize the skill information of the at least one agent in order to assign a task to the at least one agent.

18. The computer-readable medium of claim 16, further comprising instructions to update an internal database based upon the skill information of at least one agent and the agent's proficiency, associated with the skill, gathered from at least one internal source selected from the group consisting of a knowledge sharing reports, mailbox repositories, and shared documents.

19. The computer-readable medium of claim 16, further comprising instructions to update an internal database based upon the skill information of at least one agent and the agent's proficiency, associated with the skill, gathered from one or more social media sources Twitter posts, Facebook account feeds, data from LinkedIn account, and data contributions from various external bulletin boards.

* * * * *